United States Patent [19]

Marshall et al.

[11] Patent Number: 4,751,685
[45] Date of Patent: Jun. 14, 1988

[54] CURRENT FEEDBACK DRIVER AND METHOD

[75] Inventors: Norman P. Marshall, Granada Hills; John J. Moll, Canoga Park, both of Calif.

[73] Assignee: Allied Corporation, Morristown, N.J.

[21] Appl. No.: 941,873

[22] Filed: Dec. 15, 1986

[51] Int. Cl.$^4$ .................. H04B 11/00; H04L 25/02
[52] U.S. Cl. ........................... 367/4; 367/134; 367/3
[58] Field of Search .............. 367/3, 4, 137, 138, 367/98, 134, 135; 178/63 A-63 F

[56] References Cited

U.S. PATENT DOCUMENTS

| | | | |
|---|---|---|---|
| 2,322,264 | 6/1943 | Turner, Jr. ........................ | 367/98 |
| 4,099,022 | 7/1978 | Fullerton et al. .................. | 367/4 |
| 4,189,703 | 2/1980 | Bennett ........................... | 367/134 |
| 4,323,988 | 4/1982 | Will et al. ....................... | 364/4 |

*Primary Examiner*—Thomas H. Tarcza
*Assistant Examiner*—Daniel T. Pihulic

[57] ABSTRACT

A cable driver and method for an underwater telemetry transmitter puts a signal on a single insulated wire forming part of a cable pack in which the wire is coiled and which is connected to a surface transmitting unit. The underwater transmitter includes an amplifier having an input, directly, time division multiplexed or digitally encoded from one or more hydrophones and an output into the primary winding of a toroidal transformer having a center hole through which the cable passes as it is deployed from the cable pack. The cable also passes through a similar toroidal transformer whose winding is connected to provide a feedback signal to the input of the amplifier. Since the insulated wire may be of greatly varying length and the cable pack may have greatly varying numbers of turns, the load impedance and resulting noise also vary and the above described arrangement makes the signal on the wire substantially independent of the variable load. A seawater ground is relied upon to close the loop between the surface transmitting unit and the opposite end of the cable at the cable pack.

7 Claims, 1 Drawing Sheet

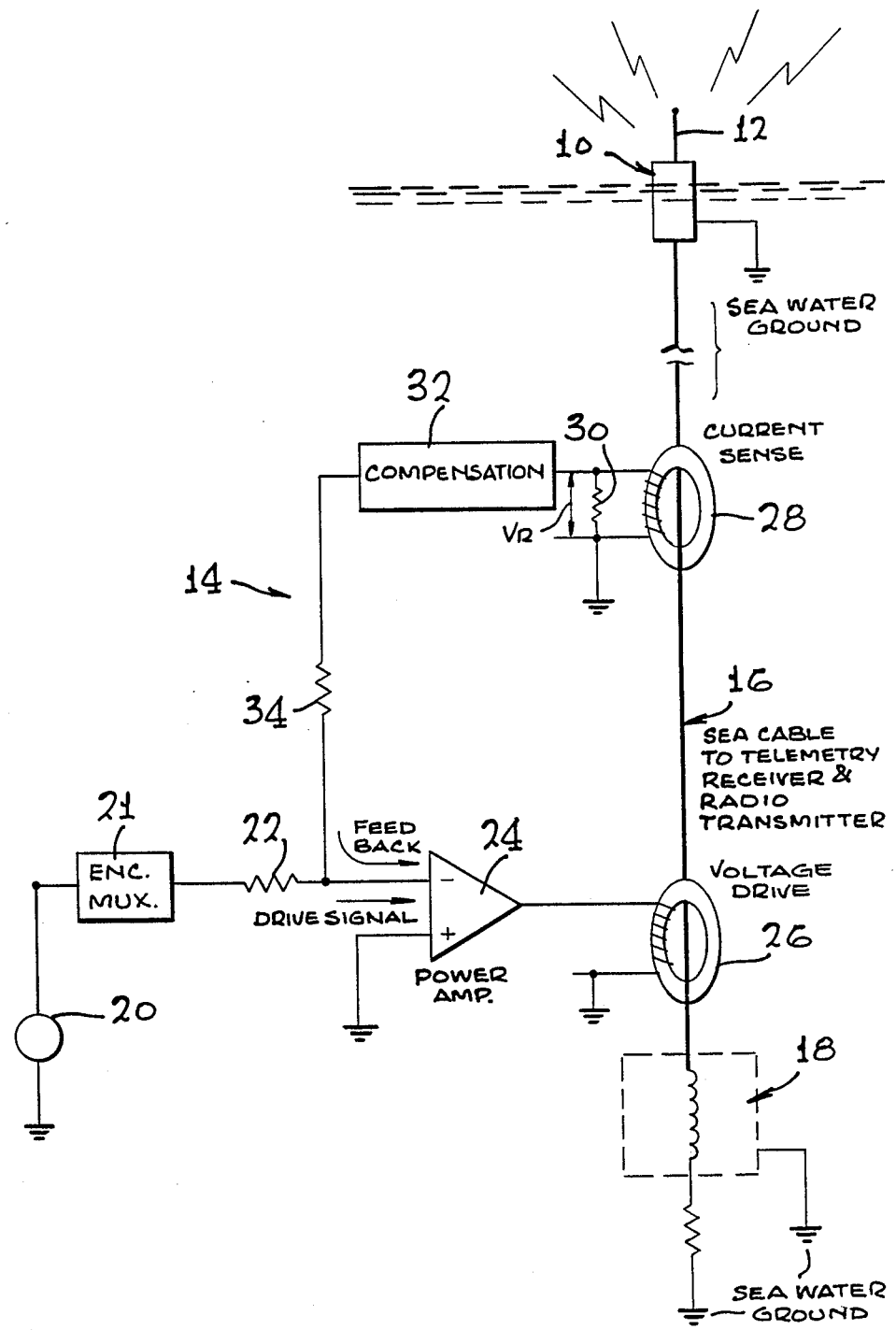

CURRENT FEEDBACK DRIVER AND METHOD

The invention described herein may be manufactured and used by or for the Government of the United States of America for governmental purposes without the payment of any royalties thereon or therefor.

The invention relates to a cable driver and method for a telemetry transmitter used underwater in which telemetry signals are fed up a cable to a surface transmitting unit.

A cable driver for an underwater telemetry transmitter including a signal source connected thereto, and a cable to a radio transmitter on the surface, further includes means connecting the telemetry transmitter to the cable. In most underwater sonar applications the length of the cable is specifically known and used as a design factor and the cable is coaxial carrying a ground line as well as one or more signal wires. In such cases there are usually adequate conventional means for dealing with extraneous sources of noise although noise problems are occasionally severe.

In the application for which the present invention was devised, other and more difficult noise problems were encountered. The sonar system is intended to be expendable, therefore comparatively inexpensive. The underwater transmitter which is connected to a hydrophone assembly carries a cable pack which may have thousands of meters of cable consisting of a single insulated wire connected between the underwater transmitter assembly and the surface unit including a radio-transmitter unit and a float. The cable pack may be adjusted to suspend the underwater transmitter assembly a hundred meters or a few thousand meters under the surface. Thus there is a coil of wire in the cable pack which varies considerably as to its length and number of turns or coils which results in a substantially varying load impedance. This also results in variations in load reflected noise. These factors are made more difficult by the fact that the system needs to have the capacity to operate at considerable depths which precludes using the normal ground wire, relying instead on a seawater ground. Thus the problem to be solved, in the above environment, was to put a signal on a single wire such that a substantially variable load will not distort the signal so that the signal can be easily recovered at the other end of the wire.

Attempts to deal with the above problem in the past have included providing a means to physically penetrate the wire (without breaking it) to make electrical contact to eliminate or control signal distortion. This system proved unreliable because it proved subject to mechanical failure and corrosion. Also, the system could not communicate while the cable was paying out. Other systems have been required to reduce the information content by an order of magnitude to be able to cope with the variation in load electrical impedance when transmitting through the cable pack. Attempts to inductively couple a voltage drive onto the cable suffered distortion from the variation in load impedance.

The cable driver of the present invention wherein the cable consists of a single insulated wire forming part of a cable pack, includes a signal source such as a hydrophone or hydrophones which may be connected to a digital encoder and or multiplexer, further connected through an amplifier having an output to a toroidal transformer through which the cable passes and is thereby inductively connected to the cable at the lower end with a second torodial transformer through which the cable passes inductively connected to the cable in proximity to the first transformer and connected as a current feedback source to the input of the amplifier. This current feedback source effectively matches the undesired signals generated by variations in load impedance and load reflected noise. In this manner the system can supply the essentially undistorted hydrophone signals up a single wire of greatly varying length to a surface transmitter.

In the drawings:

The single FIGURE is a schematic drawing of a sonar system incorporating our invention.

Referring now to the drawing, an expendable sonar system is shown including a surface unit 10 which includes a radio transmitter with an antenna 12. Supplying information to the transmitter is an underwater unit 14 which is connected to the surface unit 10 by means of a sea cable 16. Units 10 and 14 are, in the usual situation, dropped into the water from an aircraft or a ship, after which unit 14 separates and descends into the ocean as the cable 16 unwinds from its container or cable pack 18 which is part of unit 14. The cable pack 18 is adjustable to permit a desired amount of cable to unwind which may be one hundred meters or less or may be a few thousand meters. Depending upon the setting and the desired depth of the underwater unit, the amount of cable remaining coiled in the cable pack 18 may constitute many turns of wire or a few. Because of the great length of wire which is desired to carry, it is not feasible to employ the usual coaxial cable including both signal and ground conductors. Therefore, the cable 16 is a single insulated wire and the ground connection constitutes a sea water loop between the surface unit 10 and the lower end of cable 16.

Sonar data is received at a hydrophone 20 (or a digitally encoded multiplexed string of many such hydrophones) and is supplied through a resistor 22, as an input to a power amplifier 24. The amplified data is inductively connected to the cable 16 by means of a transformer 26. Connected at a short distance up the cable from transformer 26 is a second transformer 28 which serves as a current feedback source, developing a signal across a resistor 30 which is then supplied to a compensation circuit 32, which limits the gain such that the feedback signal is always negative phase. the output of compensation circuit 32 appears across a resistor 34 and is combined with the signal from hydrophone 20 at the input terminal of power amplifier 24. The difference between the input signal and the replica of the signal on the cable via transformer 28 constitutes an error signal, this error signal is amplified and coupled onto the cable 16 via transformer 26 to produce the derived replica of the input signal on the cable 16. Since transformer 28 faithfully presents a replica of the current in the cable 16, the overall effect of the circuit is to place current on the cable which is a replica of the input voltage to the amplifier 24. The circuit is thus a current source transmitter which is unaffected by load impedance or signal generated in the cable 16 beyond the transmission coupling area.

The transformers 26 and 28 are actually toroidal transformers in which the cable 16 actually passes through the hole in the center of the toroids as it reels out of the cable pack. Thus the cable acts as a single turn secondary winding on transformer 26 coupling the signal from power amplifier 24 onto cable 16 and as a single turn primary winding on transformer 28, coupling the signal from cable 16 through compensator 30 to the input summing junction of the power amplifier. The cable 16 is actually guided through a plastic tube which restricts the seawater coupling in the transformers.

While a single embodiment is disclosed herein those skilled in the art will be aware of modifications which could be made without the scope of the appended claims.

We claim:

1. A cable driver for a telemetry transmitter used with an underwater signal source including a cable, a float with a radio transmitter attached to one end of said cable and a signal source at the opposite end of said cable carried in the water at a substantial depth connected to said transmitter
    characterized in that said cable driver comprises a single insulated wire with an amplifier having its input connected to said signal source, said amplifier output being inductively coupled to said cable through a first inductive coupling means near said opposite end of said cable, said cable being carried in a cable pack adjacent to said amplifier, a second inductive coupling means inductively connected to said cable also adjacent to said amplifier output and connected as a feedback signal source to the input of said amplifier, and seawater ground means associated with said cable and said float to close the ground loop between said cable pack and said float.

2. A cable driver as claimed in claim 1 wherein said signal source includes at least one hydrophone connected to said amplifier means.

3. A cable driver as claimed in claim 2 wherein said first inductive coupling means includes a toroidal transformer having a primary winding connected to said amplifier output and said cable passes through the center of said toroidal transformer such that the amplified signal from said amplifier appears on said cable, and said second inductive coupling means includes a second toroidal transformer wherein said cable passes through its center and having a winding connected to provide current feedback to the input of said amplifier.

4. The cable driver as claimed in claim 2 wherein said signal source includes a plurality of hydrophones and a digital encoder and/or multiplexer having its output connected to said amplifier.

5. A cable driver for a telemetry transmitter used underwater including a cable, a float with a radio transmitter having a sea water ground attached to one end of said cable and a signal source including an amplifier at the opposite end of said cable carried in the water at a substantial depth connected to said transmitter
    characterized in that said cable driver comprises a single insulated wire carried in a cable pack adjacent said amplifier, said signal source comprises at least one hydrophone with said amplifier having its input connected thereto, the output of said amplifier including a first toroidal transformer inductively coupled to said cable near said cable pack, a sea water ground connected to said cable pack, a second toroidal transformer inductively connected to said cable in proximity to said first toroidal transformer connected to provide a feedback signal to the input of said amplifier, such that said cable driver produces on said wire a current source replica of the source signal.

6. In a sonar system having a surface transmitting unit, a separate cable pack connected to said unit and adjustable to pay out cable to a desired depth, said cable pack also carrying an underwater amplifier and a signal source connected to said amplifier, said cable constituting a single insulated wire having a sea water ground, wherein said cable pack, underwater amplifier and signal source are separated from said surface transmitting unit and drop to a desired depth as said cable is deployed,
    a method of driving said cable from said underwater signal source to minimize distortion caused by the variable inductive load represented by said cable pack comprising
    a first inductive means and means inductively connecting said cable to said inductive means such that said signal appears on said cable,
    providing a second inductive means inductively connecting said cable to said second inductive means to provide current feedback to the input of said underwater amplifier and
    providing seawater ground means for said surface transmitting unit to close the ground loop from said cable pack.

7. In a sonar system having a surface transmitting unit, a separate cable pack connected to said unit and adjustable to pay out cable to a desired depth, said cable pack also carrying an underwater amplifier and a signal source connected to said amplifier, said cable constituting a single insulated wire having a sea water ground, wherein said cable pack, underwater amplifier and signal source are separated from said surface transmitting unit and drop to a desired depth as said cable is deployed,
    a method of driving said cable from said underwater signal source to minimize distortion caused by the variable inductive load represented by said cable pack comprising
    driving said amplifier into a winding forming part of a toroidal transformer,
    feeding said cable through the center of said toroidal transformer such that said signal appears on said cable,
    providing a second toroidal transformer in proximity to said first toroidal transformer and feeding said cable through the center of said second toroidal transformer, said second toroidal transformer having a secondary winding connected to provide current feedback to the input of said underwater amplifier.

* * * * *